United States Patent
Wan et al.

(10) Patent No.: US 12,158,831 B2
(45) Date of Patent: Dec. 3, 2024

(54) AUTOMATIC PERFORMANCE EVALUATION IN CONTINUOUS INTEGRATION AND CONTINUOUS DELIVERY PIPELINE

(71) Applicant: SAP SE, Walldorf (DE)

(72) Inventors: Deng Feng Wan, Shanghai (CN); Zuxing Wang, Shanghai (CN); Xia Yu, Shanghai (CN)

(73) Assignee: SAP SE, Walldorf (DE)

( * ) Notice: Subject to any disclaimer, the term of this patent is extended or adjusted under 35 U.S.C. 154(b) by 576 days.

(21) Appl. No.: 17/482,800

(22) Filed: Sep. 23, 2021

(65) Prior Publication Data

US 2023/0086361 A1    Mar. 23, 2023

(51) Int. Cl.
| | | |
|---|---|---|
| *G06F 11/34* | (2006.01) | |
| *G06F 8/65* | (2018.01) | |
| *G06F 9/455* | (2018.01) | |
| *G06F 9/54* | (2006.01) | |
| *G06F 11/36* | (2006.01) | |

(52) U.S. Cl.
CPC .......... *G06F 11/3419* (2013.01); *G06F 8/65* (2013.01); *G06F 9/45558* (2013.01); *G06F 9/546* (2013.01); *G06F 11/3692* (2013.01); *G06F 2009/45579* (2013.01); *G06F 2201/81* (2013.01)

(58) Field of Classification Search
CPC .......... G06F 11/3419; G06F 8/65; G06F 8/77; G06F 2201/865; G06F 11/1433
See application file for complete search history.

(56) References Cited

U.S. PATENT DOCUMENTS

| | | | | |
|---|---|---|---|---|
| 11,029,938 | B1 * | 6/2021 | Sethi | G06F 9/451 |
| 11,194,566 | B1 * | 12/2021 | Gabrielson | G06F 8/65 |
| 2019/0317754 | A1 * | 10/2019 | Mosquera | G06F 8/77 |
| 2022/0164452 | A1 * | 5/2022 | Landman | G06F 8/60 |

OTHER PUBLICATIONS

"Continuous Integration and Delivery by SAP," https://help.sap.com/viewer/8cacec64ed854b2a88e9a0973e0f97a2/Cloud/en-US, printed Aug. 11, 2021, 4 pages.

"Continuous Integration and Delivery Introduction Guide," https://help.sap.com/viewer/ee5a61247061455ab232c19179fe4c3b/Cloud/en-US, printed Aug. 11, 2021, 19 pages.

(Continued)

*Primary Examiner* — Ricky Go
(74) *Attorney, Agent, or Firm* — Klarquist Sparkman, LLP

(57) ABSTRACT

A computer-implemented method can receive a software update for a software application deployable on a target system and perform an automatic performance test of the software application incorporating the software update on the target system. The automatic performance test can be integrated in a continuous integration and continuous delivery (CI/CD) pipeline. The method can collect a plurality of performance metrics measured when performing the automatic performance test and determine a performance score based on the plurality of performance metrics. Responsive to detecting the performance score is below a predefined performance threshold, the method can cause the CI/CD pipeline to reject the software update to the software application.

20 Claims, 8 Drawing Sheets

(56) References Cited

OTHER PUBLICATIONS

Kyle Doyle, "Gatling vs JMeter vs The Grinder: Comparing Load Test Tools," https://www.baeldung.com/gatling-jmeter-grinder-comparison, printed Aug. 25, 2021, 16 pages.
"Load testing," Wikipedia, https://en.wikipedia.org/wiki/Load_testing, printed Aug. 25, 2021, 8 pages.
"LoadRunner results analysis," https://titanwolf.org/Network/Articles/Article?AID=f1bd4634-a4e2-4a03-b8f5-0dc917fade9a#gsc.tab=0, printed Aug. 10, 2021, 28 pages.
"LoadRunner—Hits per second Graph," How to read Hits per second graph, https://www.perfmatrix.com/loadrunner-hits-per-second-graph/, printed Aug. 10, 2021, 7 pages.
"Middleware," Wikipedia, https://en.wikipedia.org/wiki/Middleware, printed Aug. 25, 2021, 4 pages.
Christoph Polh, CI/CD in ABAP—An Outside-In View, https://blogs.sap.com/2020/03/03/ci-cd-in-abap-an-outside-in-view/, printed Aug. 11, 2021, 11 pages.
Jyoti Sahoo, "What is a CI/CD Pipeline? Continuous Integration and Continuous Delivery Explained," https://www.opsmx.com/blog/what-is-a-ci-cd-pipeline/, printed Aug. 25, 2021, 22 pages.
Bharath Shrikanth, Jenkins for Test Automation: Tutorial-BrowserStack, https://www.browserstack.com/guide/jenkins-for-test-automation, printed Aug. 25, 2021, 9 pages.
"Softmax function," Wikipedia, https://en.wikipedia.org/wiki/Softmax_function, printed Jul. 26, 2021, 8 pages.
Simon E. Spero, "Analysis of HTTP Performance problems," http://www.w3.org/Protocols/HTTP-NG/http-prob.html, printed Aug. 10, 2021, 6 pages.
"What is Elasticsearch?," https://www.elastic.co/what-is/elasticsearch, printed Aug. 25, 2021, 5 pages.
"Zabbix," Wikipedia, https://en.wikipedia.org/wiki/Zabbix, printed Aug. 25, 2021, 6 pages.

* cited by examiner

LoadTestSummary: 20
  Throughput:20
  hitPerSecond:20
  httpPerSecond:20
  errorRate:40
WebServer: 10
AppServer: 10
Database: 10
Middleware: 10
  Redis: 30
  Kafka: 40
  Solr: 30
FeatureTests : 40
  FeatureA: 30
  FeatureB: 10
  FeatureC: 15
  FeatureD: 15
  FeatureE: 30

AUTOMATIC PERFORMANCE EVALUATION IN CONTINUOUS INTEGRATION AND CONTINUOUS DELIVERY PIPELINE

BACKGROUND

In software engineering, a continuous integration and continuous delivery pipeline (hereinafter "CI/CD pipeline") refers to the automation that enables incremental code changes from developers' desktops to be delivered quickly and reliably to production. Specifically, continuous integration (CI) describes a software development process, in which various team members integrate their contributions frequently into a single main line. Before each integration, the changes are verified through builds and automated testing. Thus, errors can be detected as quickly as possible and integration problems can be prevented before completing development. Extending the concept of CI, continuous delivery (CD) adds the aspect that any changes that have successfully passed the tests are immediately ready to be deployed to production. By automating the software delivery process, the CI/CD pipeline represents one of the best practices in software engineering. It can remove manual errors, provide standardized feedback to developers, and enable fast product iterations.

One of the automatic tests typically included in the CI/CD pipeline is a performance test which evaluates many different aspects (e.g., response time, resource utilization, etc.) of a software when running on a target computer system. The performance test can be complicated. As a result, it can be challenging to determine whether a performance test passes or fails. Thus, room for improvements exists for automatic performance evaluation of a software in the CI/CD pipeline.

BRIEF DESCRIPTION OF THE DRAWINGS

FIG. 6 is an example configuration defining weights for calculating a performance score.

DETAILED DESCRIPTION

Example 1

Overview of CI/CD Pipeline

A CI/CD pipeline includes a series of steps to be performed in order to deliver a new version of software. The CI can employ automated software build and test steps to ensure that code changes being merged into a version control repository are reliable. The code can then be delivered quickly and seamlessly as a part of the CD process. Thus, with a CI/CD pipeline, a software release artifact can move and progress through the pipeline from the code check-in stage through the test, build, deploy, and production stages. Although it is possible to manually execute individual steps of a CI/CD pipeline, a significant advantage of CI/CD pipelines is achieved through automation, which can speed the process and reduce errors, thus making it possible for enterprises to deliver incremental software update frequently (e.g., weekly, daily, hourly, etc.) and reliably.

Figure 1:
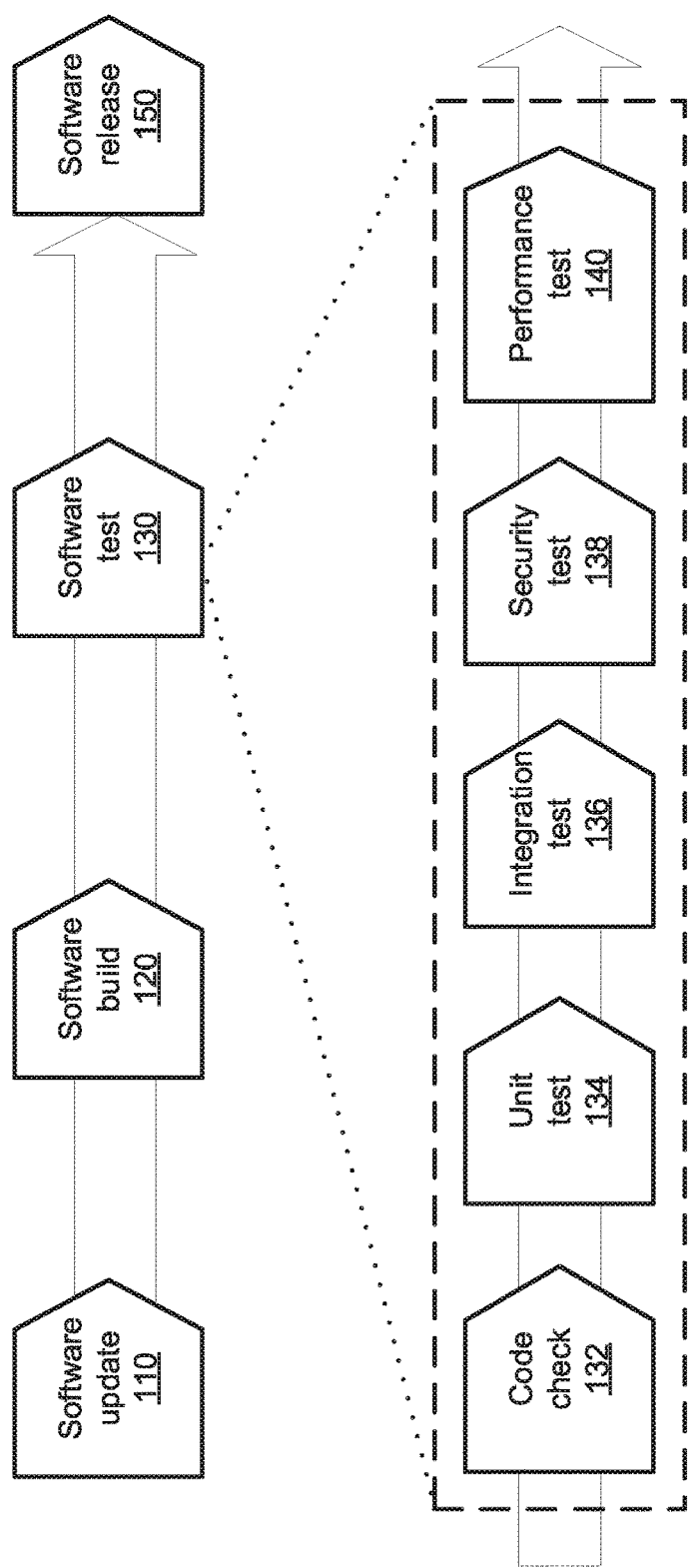
FIG. 1 is an overall block diagram of an example CI/CD pipeline.

FIG. 1 shows an overall block diagram of an example CI/CD pipeline 100. As depicted, the CI/CD pipeline 100 can receive a software update 110. The software update 110 can include code changes to a software that has been previously deployed. In certain examples, a source code management system can manage the software update process. For example, a developer can pull a current version of the software from a version control repository, make code changes to the software, and then push the updated software including the code changes to the version control repository.

A software build 120 can be created based on the software update 110. Such build process can be performed automatically after CI/CD pipeline 100 receives the software build 120. Build tools can be used to compile and create executable files or packages depending on the programming language used to write the source code. In certain cases, SQL scripts can be generated and tested along with infrastructure configuration files during the build. Certain build verification and unit tests may also be incorporated in the build process.

Software test 130 can be performed on the software build 120. The software test 130 desirably can be comprehensive and identify most, if not all, bugs in the software before its release. The software test 130 can include a plurality of tests having different scopes and/or purposes. For example, the software test 130 can include one or more code checks 132, one or more unit tests 134, one or more integration tests 136, one or more security tests 138, and one or more performance tests 140. Other tests can also be included in the software test 130. These tests can be integrated within the CI/CD pipeline 100 and arranged in different sequences. For example, although FIG. 1 shows that the security test 138 is performed before the performance test 140, the security test 138 can be performed after the performance test 140 in some circumstances. To take advantage of the CI/CD pipeline 100, these tests are typically automated as much as possible.

After the software test 130 is successfully completed, the updated software is deemed ready for software release 150. For example, with a click of a button, the updated software can be removed from the CI/CD pipeline 100 and deployed on a target computing system, replacing the previous version of the software deployed thereon.

As depicted in FIG. 1, various automation tests (e.g., code check tests 132, unit tests 134, integration tests 136, security tests 138, performance tests 140) can be integrated into the CI/CD pipeline 100 to safeguard its smooth running operation. Whenever there is a test failure, the CI/CD pipeline 100 can pause and wait for a fix before resuming running. In other words, a failure of the software test 130 can reject the software update 110 (i.e., the previous version of the software deployed on the target computing system remains intact). For example, if the test fails, the code changes made in the software update 110 can stay in a buffer zone (or other temporary storage location) and will not be merged to a main code repository of the software. Since there is no update in the main code repository, the code changes to the software are effectively rejected for fixing, and the version of the software will not be updated. The evaluation result can be kept in the CI/CD pipeline 100 as a status indicator (e.g., a red flag or the like) until the next software update (with new code change) enters the CI/CD pipeline 100 and successfully passes the software test 130, at which point the status indicator can be updated (e.g., changed to a green flag or the like). On the other hand, a pass of the software test 130 can enable and/or trigger the software release 150 (i.e., to replace the previous version of the software deployed on the target computing system).

Although most other tests (e.g., 132, 134, 136, 138) have clearly defined pass/fail criteria, performance tests 140 can be complicated because the performance of a software application is contextual and involves many factors. Depending on particular circumstances, different aspects of the software application may have different significance. For example, performance test results usually include parameters such as test case response time, throughput, resources utilization status (e.g., CPU usage, memory usage, disk input/output status, network throughput, etc.), among many others. The response time may be more or less important than resource utilization status depending on circumstances. If a test failure is indicated (thus pausing the CI/CD pipeline 100) simply because one performance test case has increased response time or decreased throughput, it could potentially result in many false alarms and lead to an unstable CI/CD pipeline 100.

Thus, it can be advantageous to have an improved automatic performance evaluation system integrated within a CI/CD pipeline which supports more intelligent, contextualized performance test of a software application. Such improved automatic performance evaluation technologies can not only safeguard the quality of software delivery but also reduce the frequency of false alarms in the CI/CD pipeline, thereby improving the overall efficiency of the CI/CD pipeline. Further, such improved automatic performance evaluation technologies can be applied across a wide variety of enterprise software environments.

Example 2

Figure 2:
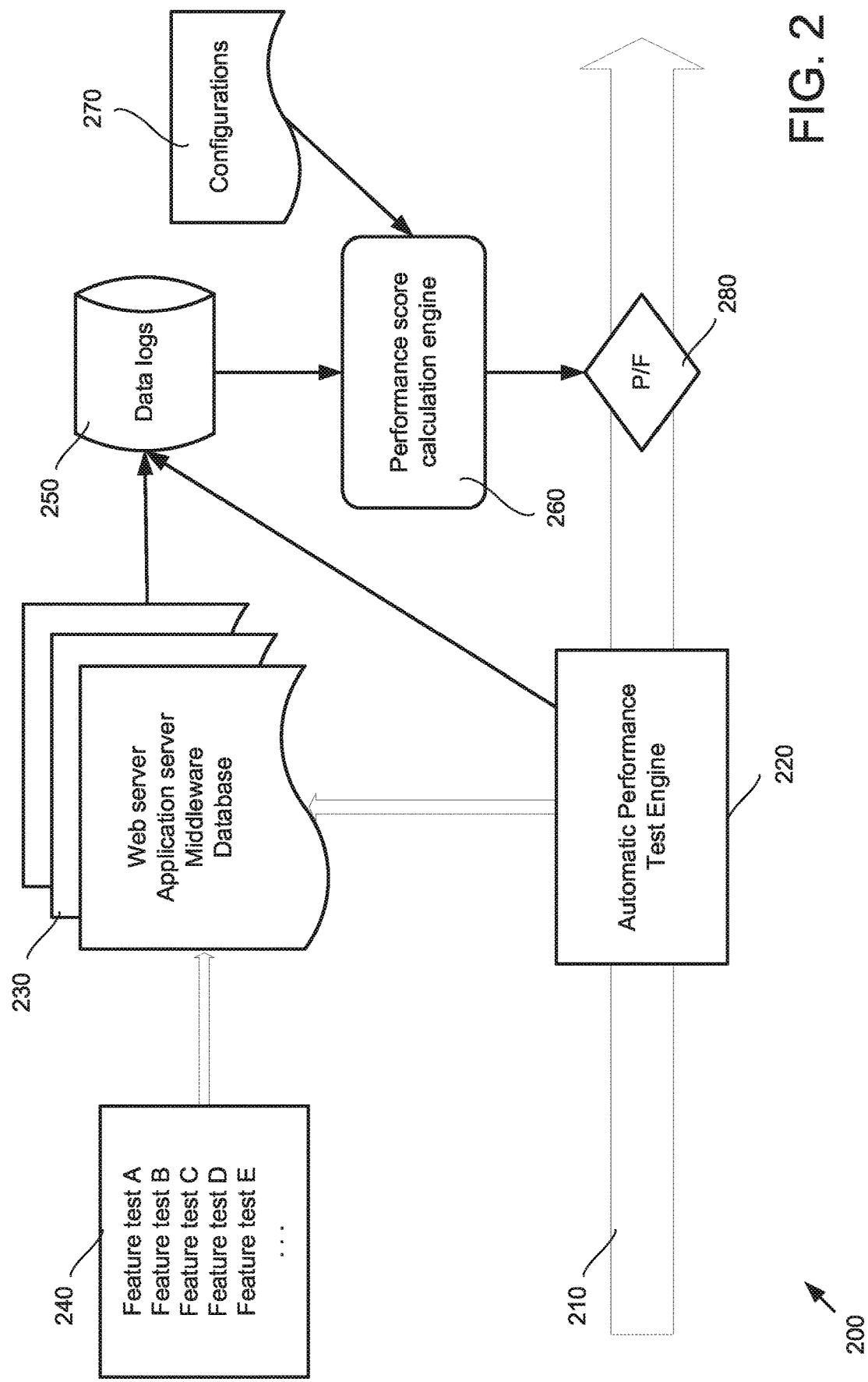
FIG. 2 is an overall block diagram of an example system for automatic performance evaluation of a software application in a CI/CD pipeline.

Example Overview of Automatic Performance Evaluation System Integrated in a CI/CD Pipeline FIG. 2 shows an overall block diagram of an example system 200 for automatic performance evaluation of a software application in a CI/CD pipeline 210.

As shown, the system 200 includes an automatic performance test engine 220 integrated within the CI/CD pipeline 210, a target system 230 on which the software application under-testing can be deployed, one or more feature tests 240, one or more data logs 250, a performance score calculation engine 260, user-customizable configurations 270, and a pass/fail (P/F) decision maker 280 integrated in the CI/CD pipeline 210.

The automatic performance test engine 220 can initiate and coordinate a performance test of a software application. In certain examples, the automatic performance test engine 220 can include a server (e.g., Jenkins or the like) which provides a number of plugins for integration with multiple test automation tools and frameworks into the CI/CD pipeline 210. In certain examples, the automatic performance test engine 220 can include tools for load testing, which creates simulated demand on software applications, servers, and databases in such a way to test or demonstrate their behavior under various conditions. For example, loading testing can model the expected usage of a software application by simulating multiple users accessing the application concurrently. Example load testing tools include Apache JMeter, Gatling, etc. Typically, a load test can measure response times, throughput rates, and resource-utilization levels of a web application, and identify the application's breaking point before reaching a peak load condition. In certain examples, the automatic performance test engine 220 can include test scripts configured to test a software application running on the target system 230. Such test scripts can model a load condition by simulating concurrent users of the target system 230.

The target system 230 can be the same as or representative of the computer system to which the software application will be released after passing all the tests (including the performance test) in the CI/CD pipeline 210. In typical examples, the target system 230 can be a cluster (e.g., a group of computers and/or servers) on which the under-tested software application can run. In certain cases, the target system 230 can include one or more web servers (e.g., Nginx, etc.) configured to deliver content for websites to clients who request them (e.g., a web browser). In certain cases, the target system 230 can include one or more applications servers (e.g., Apache Tomcat, etc.) configured to host software applications. In certain cases, the target system 230 can also include middleware which provide services to software applications beyond those available from the operating system. One example middleware is cache server (e.g., Redis, etc.) which can cache data and other files so as to speed up access to information that has been retrieved from database(s) previously. Another example middleware is message queue server (e.g., Kafka, etc.) which is responsible for communications between application servers and can queue and prioritize messages as needed. Yet another example middleware is search engine server (e.g., Apache Solr, etc.) which can provide an enterprise search platform for full-text search, hit highlighting, real-time indexing, and other functions. In certain cases, the target system 230 can further include one or more databases for storing data used by the software application and various servers described above.

From a user's perspective, testing of the software application running on the target system 230 may comprise multiple feature tests 240 (e.g., feature tests A, B, C, D, E, etc.), which respectively test different features or functional areas of the software application under load conditions. In certain circumstances, some of the feature tests 240 may be independent from each other. In certain circumstances, some of the feature tests 240 may have certain overlaps (e.g., a software function may be tested in two or more feature tests). Running of the feature tests 240 can be coordinated by the automatic performance test engine 220 (e.g., by running the test scripts).

After receiving a software update for a software application which can be deployed on the target system 230, the automatic performance test engine 220 can automatically initiate a plurality of tests (including the feature tests 240) to monitor the performance of the software application incorporating the software update on the target system 230. Such tests can generate a plurality of performance metrics indicating performance status of the software application running on the target system 230. In certain examples, these performance metrics can be collected using one or more application monitoring tools (e.g., Zabbix, etc.). As depicted in FIG. 2, these collected performance metrics can be stored in one or more data logs 250, which can be maintained in a central repository (e.g., Elastic search, etc.). Example data logs includes application debug logs, load test results, and various other performance test results logs, as described more fully below.

Based on these performance metrics collected in the data logs 250, the performance score calculation engine 260 can use a specific formula to determine a performance score, which reflects the overall performance of the software application running on the target system 230. As descried further below, determination of the performance score involves calculation of a plurality of component scores which respectively correspond to one or more feature tests 240 of the software application and one or more components of the target system 230 (e.g., the web server, the application server, the middleware, the databases, etc.).

In addition, determination of the performance score can be impacted by weights and other settings stored in a configuration file, e.g., 270. Depending on the specific software update and/or the target system on which the software application is deployed, an administrator can change the weights specified in the configuration file 270, as described further below.

The performance score can be passed to the decision maker 280. By comparing the performance score with a predefined threshold value (which can also be specified in the configuration file 270), the decision maker 280 can determine whether the performance test passes or fails. If the software application passes the performance test, it will be moved to the next stage in the CI/CD pipeline 210. If the software application passes all tests in the CI/CD pipeline 210, the software application (incorporating the software upgrade) can be released. On the other hand, if the software application fails the performance test, the CI/CD pipeline 210 will pause and reject the software update (until the issues underlying the performance test failure are fixed).

In practice, the systems shown herein, such as the system 200, can vary in complexity, with additional functionality, more complex components, and the like. For example, there can be additional functionality within the automatic performance test engine 220. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 200 and any of the other systems described herein can be implemented in conjunction with any of the hardware components described herein, such as the computing systems described below (e.g., processing units, memory, and the like). In any of the examples herein, the performance metrics, the performance score and component scores, the weights, and the like can be stored in one or more computer-readable storage media or computer-readable storage devices. The technologies described herein can be generic to the specifics of operating systems or hardware and can be applied in any variety of environments to take advantage of the described features.

Example 3

Example Workflow of Automatic Performance Evaluation in a CI/CD Pipeline

Figure 3:
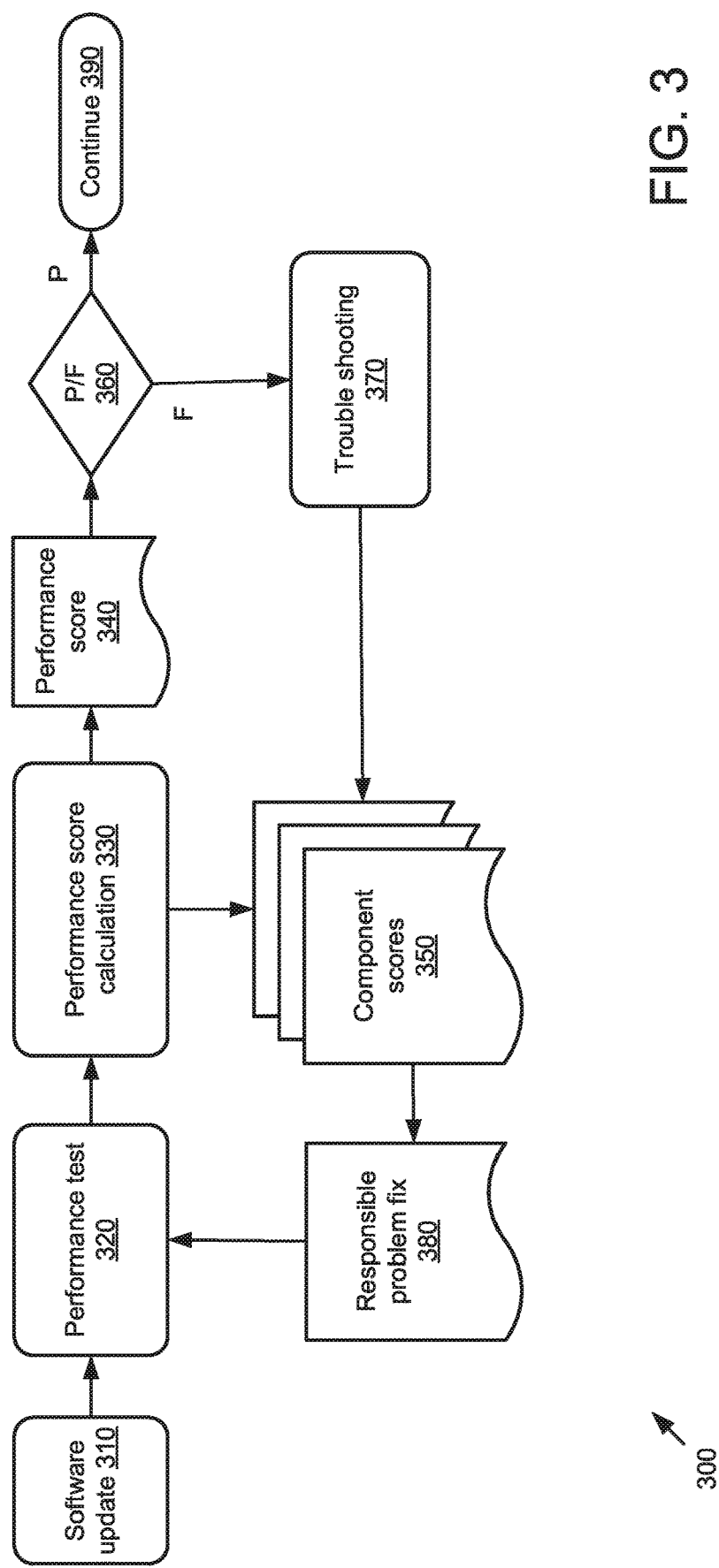
FIG. 3 is a flow diagram depicting an example process involved in automatic performance evaluation of a software application in a CI/CD pipeline.

FIG. 3 depicts an example workflow 300 involved in automatic performance evaluation of a software application in a CI/CD pipeline.

After receiving a software update 310 to a software application, an automatic performance test 320 is performed (e.g., triggered and coordinated by the automatic performance test engine 220) which can run the software application incorporating the software update 310 on a target system (e.g., 230). The performance test 320 invokes a method call for performance score calculation 330 (e.g., via the performance score calculation engine 260), which can determine a performance score 340 that measures an overall performance of the software application running on the target system. In addition, the performance score calculation 330 can generate a plurality of component scores 350 which respectively measure the performance of one or more feature tests of the software application and one or more components of the target system. In certain examples, the performance score 340 can be a weighted sum of the component scores 350.

The performance score 330 can be evaluated at 360 (e.g., via the decision maker 280) to determine whether the performance test passes or fails. If the performance test passes, responsive to determining that the performance test passes, the software application will proceed 390 to the next stage in the CI/CD pipeline (and be ready for official release if the software application passes all other tests). On the other hand, if the performance test fails, responsive to determining that the performance test fails, the CI/CD pipeline will pause to allow trouble shooting 370 the root causes underlying the performance test failure. The problems may be related to issues of the target system (e.g., network latency, cache server outage, etc.) or may arise from the software application itself (e.g., revealed by the feature tests). Thus, by analyzing the component scores 350, the system can identify the root causes that led to the performance test failure and direct responsible developers to fix the problems 380. After the fix, the software application can be submitted to performance test 320 again.

Example 4

Example Overall Method of Automatic Performance Evaluation in a CI/CD Pipeline

Figure 4:
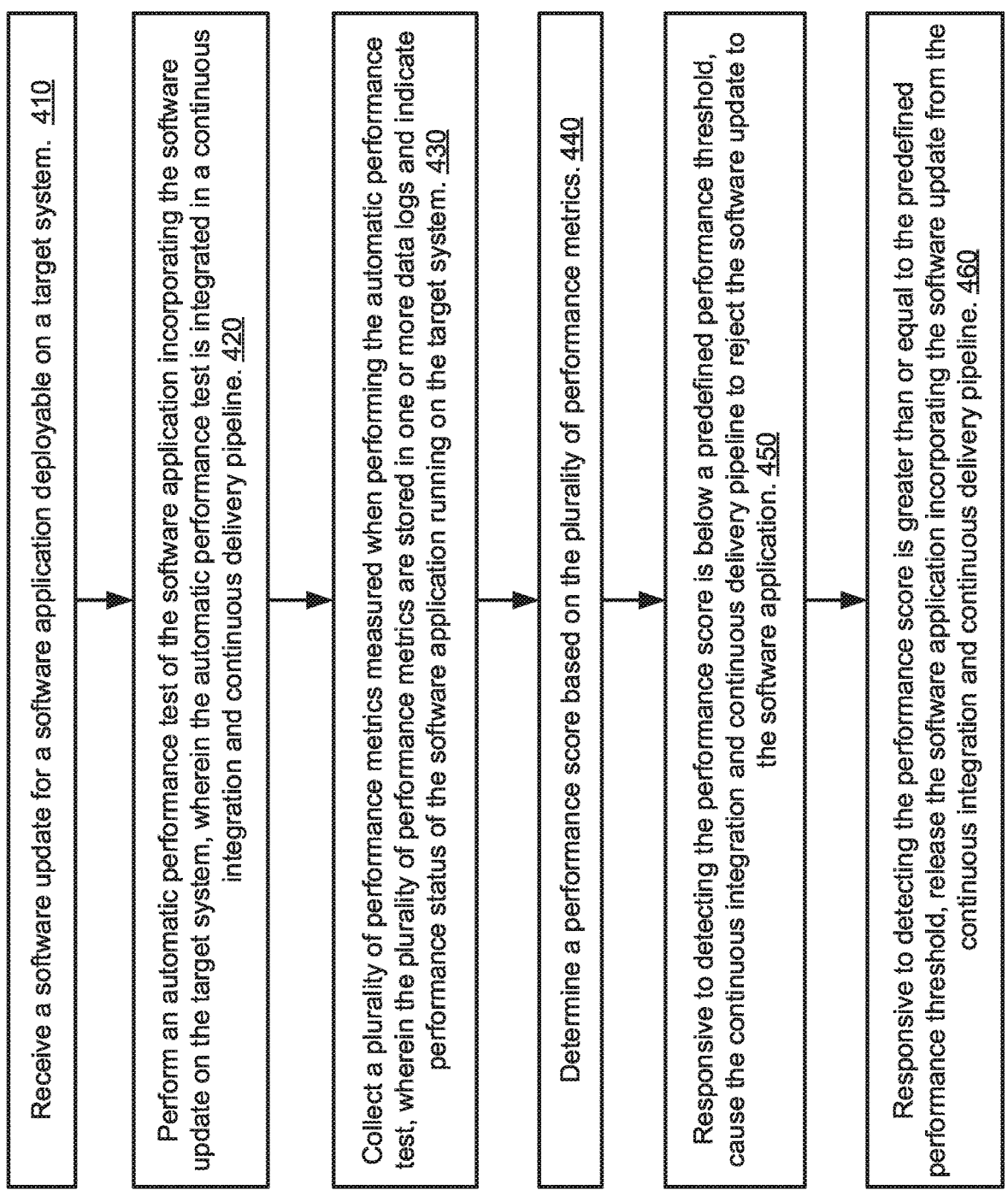
FIG. 4 is a flowchart illustrating an example overall method of automatic performance evaluation of a software application in a CI/CD pipeline.

FIG. 4 is a block diagram illustrating an example overall method 400 of implementing automatic performance evaluation in a CI/CD pipeline, and can be performed, for example, by the system of FIG. 2.

At 410, the method 400 can receive a software update for a software application deployable on a target system (e.g., 230). As described herein, the software update can be a candidate (e.g., pre-release) software update.

At 420, the method 400 can perform an automatic performance test of the software application incorporating the software update on the target system. The automatic performance test is integrated in a CI/CD pipeline (e.g., 210). For example, the automatic performance test can be initiated and coordinated by an automatic performance test engine (e.g., 220) integrated with the CI/CD pipeline.

At 430, the method 400 can collect a plurality of performance metrics measured when performing the automatic performance test. The plurality of performance metrics can be stored in one or more data logs (e.g., 250) and indicate performance status of the software application running on the target system.

At 440, the method 400 can determine a performance score based on the plurality of performance metrics (e.g., via the performance score calculation engine 260).

Responsive to detecting whether the performance score meets a predefined performance threshold, the method can switch between two different actions as shown in steps 450 and 460.

At 450, responsive to detecting the performance score is below a predefined performance threshold, the method 400 can cause the CI/CD pipeline to reject the software update to the software application.

At 460, responsive to detecting the performance score is greater than or equal to the predefined performance threshold, the CI/CD pipeline can release the software application incorporating the software update from the CI/CD pipeline, e.g., if the software application also passes other required tests in the CI/CD pipeline.

The method 400 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 5

Example Performance Score and Component Scores

In any of the examples herein, the automatic performance test in a CI/CD pipeline can determine a performance score which measures an overall performance of the software application running on a target system. For illustration purposes, the maximum performance score is set to 100 points and the minimum performance score is set to 0 point in the following examples, although it is to be understood that the range of the performance score can be set to different values (e.g., the range can be from 0 to 1 point, from 0 to 10 points, etc.). The performance score can be compared to a predetermined performance threshold to determine if the automatic performance test passes or fails. For example, if the performance threshold is set to 80 points, then the performance test passes if the performance score is greater than or equal to 80 points or fails if the performance score is below 80 points. In certain examples, the performance threshold can be specified in a configuration file (e.g., 270) and adjusted by an administrator.

Figure 5:
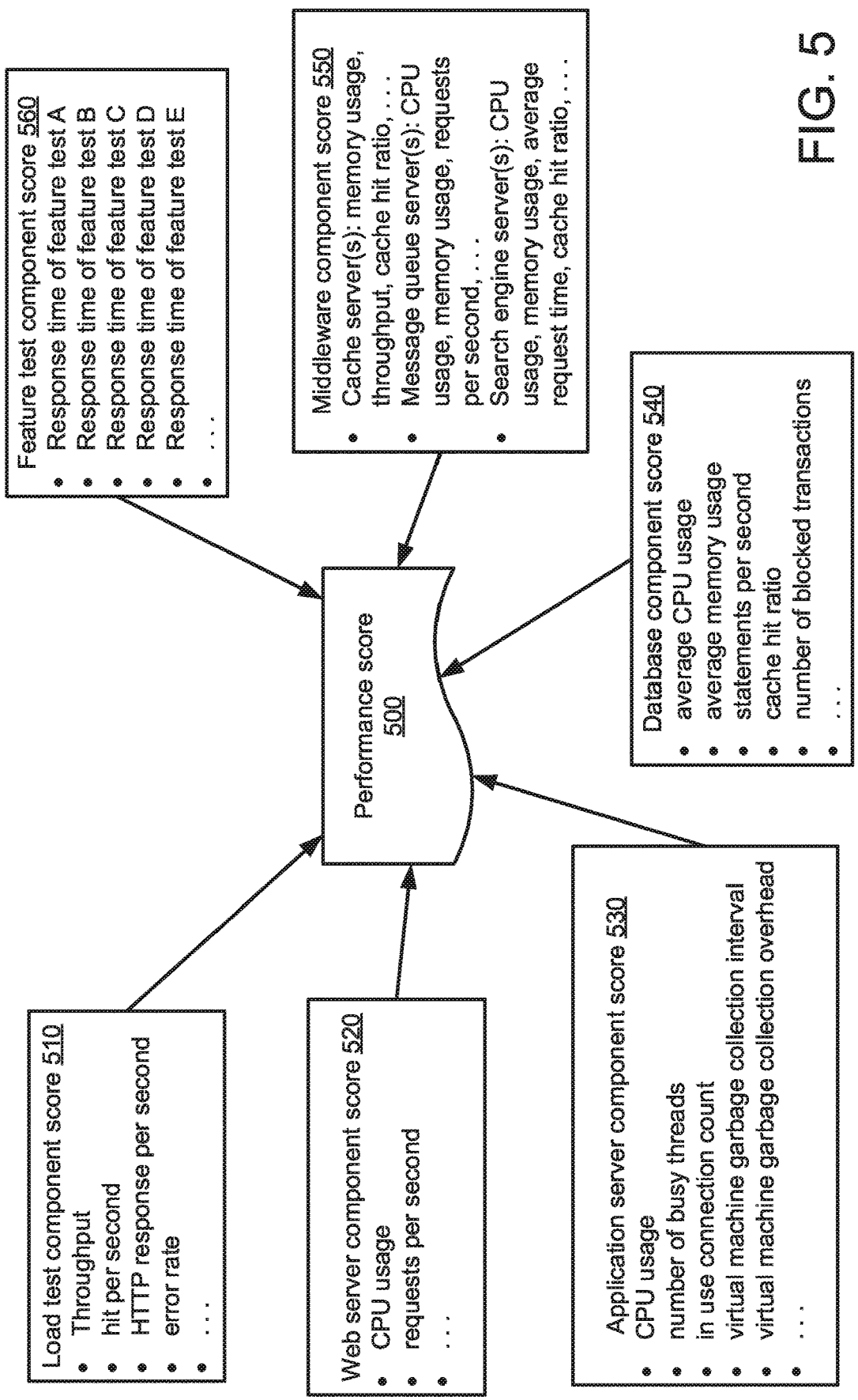
FIG. 5 is a block diagram illustrating example metrics used to calculate a performance score.

The performance score can be composed of a plurality of component scores. In one particular example, as illustrated in FIG. 5, the performance score 500 can be composed of the following components: load test component score 510, web server component score 520, application server component score 530, database component score 540, middleware component score 550, and feature test component score 560. Although six specific component scores are shown in this example, it is to be understood that the performance score 500 can be composed of different number and/or type of component scores. For example, in certain cases, the web server and application server component scores can be combined into one web/application server component score. In certain cases, other component scores can be introduced into the mix of the performance score 500.

Among the depicted component scores, the feature test component score 560 can measure performance of specific features or functional areas of the software application. Reduction of the feature test component score 560 can indicate issues in the software application (e.g., software bugs, inefficient codes, etc.) that may need to be fixed. The component scores 520, 530, 540 and 550 can respectively measure performance of specific components (e.g., web server, application server, databases, and middleware) of the target system on which the software application is running Reduction of these component scores can indicate issues of the target system (e.g., network latency, cache server outage, CPU/memory usage outage, etc.). The load test component score 510 can measure an overall load performance of the software application running on the target system. Thus, the load test component score 510 can be affected by the "health" of both the software application and the target system.

In certain examples, the performance score (PS) 500 can be a weighted sum of different component scores, i.e., $$PS=\Sigma_{i=0}^{N} w_i \times s_i$$

Here, N represents the total number of component scores, and $s_i$ and $w_i$ respectively represent the i-th component score and its corresponding weight.

The weights for respective component scores can be specified in a configuration file (e.g., 270), and an automatic check function can be implemented to ensure that the sum of the weights is 1.0 (or 100%). For example, the weights for the six depicted component scores 510, 520, 530, 540, 550, and 560 can be set to 10%, 10%, 10%, 20%, 10%, and 40%, respectively. Because these weights are configurable, they can be dynamically changed based on needs. For example, in the example described above, the feature tests are giving a higher weight (40% or 40 points) than each other individual component of the target system.

Example 6

Example Performance Metrics of Load Test Results

As described above, the performance test can include a load test performed by certain load testing tools (e.g., Apache JMeter, Gatling, etc.). After running the load test for a certain period of time (e.g., one or two hours, etc.), the load testing tools can generate a plurality of load test metrics that summarize the overall load test results, which reflect the overall health status of the target system and software application under load conditions. As described above, the load test metrics can be saved in one or more data logs (e.g., 250).

As described herein, the load test component score 510 can be calculated based on the load test metrics. Example load test metrics includes throughput, hit per second, HTTP response per second and error rate. The load test component score 510 may also comprise other load test metrics if they are available and deemed important for evaluating the status of the load test.

In certain examples, different weights can be applied to different load test metrics. For example, when calculating the load test component score 510, the weights for throughput, hit per second, HTTP response per second and error rate can be respectively set to 20%, 20%, 20%, and 40% (with a total of the weights equal to 100%). Similarly, the weights for different load test metrics can be specified in a configuration file (e.g., 270).

For each specific load test metrics, a corresponding baseline value can be predetermined based on the same load test metrics obtained from one or more previous load tests that are deemed to be acceptable. For example, after running a load test in an earlier build of the software application, if it is determined (e.g., via manual examination) that the overall performance of the software application is good, then all the metrics obtained from that load test run can be saved as respective baseline values. In another examples, the baseline values can be calculated as running averages of respective load test metrics obtained from multiple load tests of previous builds that are deemed to be acceptable.

In any of the examples described herein, a performance metric is deemed to have a positive variation if an increase of the performance metric represents an improved performance. Conversely, a performance metric is deemed to have a negative variation if an increase of the performance metric represents a worsened performance. For example, for load test metrics, the throughput, hit per second, and HTTP response per second all have positive variations, whereas the error rate has a negative variation.

If a performance metric has a positive variation, a corresponding metric score (MS) can be calculated using the following formula:
 (a) If a measured performance metric (MPM) is greater than or equal to a corresponding baseline value (BV), then the MS can be set to the weight (W) applied to the performance metric, i.e., MS=W.
 (b) If a measured performance metric (MPM) is less than the corresponding baseline value (BV), then the MS can be calculated as:

$$MS=(1-(BV-MPM)/BV) \times W \times 100$$

If a performance metric has a negative variation, a corresponding MS can be calculated using the following formula:
 (a) If a measured performance metric (MPM) is less than or equal to a corresponding baseline value (BV), then the MS can be set to the weight applied to the performance metric, i.e., MS=W.
 (b) If a measured performance metric (MPM) is greater than the corresponding baseline value (BV), then the MS can be calculated as:

$$MS=(1-(MPM-BV)/BV) \times W \times 100$$

Thus, after running a load test, the metric score for each of the load test metrics (e.g., throughput, hit per second, HTTP response per second, error rate, etc.) can be calculated. According to a representative example, the load test component score 510 can be calculated as a sum of the metric scores corresponding to each of the load test metrics (e.g., the metric scores for throughput, hit per second, HTTP response per second, and error rate, respectively).

Example 7

Example Performance Metrics of Target System Components

As described above, the automatic performance test can run the software application on a target system (e.g., 230), which can include one or more web servers, one or more application servers, one or more middleware servers, and one or more databases. Using an application monitoring tool (e.g., Zabbix, etc.), a plurality of performance metrics related to some components of the target system can be collected and saved in one or more data logs (e.g., 250).

Example performance metrics related to the web servers (also referred to as "web server metrics") include CPU usage and requests per second. Example performance metrics related to the application servers (also referred to as "application server metrics") include CPU usage, number of busy threads, in use connection count, virtual machine garbage collection interval, and virtual machine garbage collection overhead. Other performance metrics of interests pertaining to the web servers and application servers may also be included. In these examples, the web servers' requests per second and application servers' garbage collection intervals have positive variations, whereas all other web server metrics and application server metrics have negative variations.

Similarly, for each of the web server metrics and application server metrics, a corresponding baseline value can be obtained based on measurement of that metric obtained in past performance tests which is deemed to be acceptable. Likewise, different web server metrics can be assigned to respective weights (with a total of 100%), and different application server metrics can also be assigned to respective weights (with a total of 100%). Using the same formulas described above, the metric score for each of the web server metrics and application server metrics can be calculated. According to a representative example, the web server component score 520 can be calculated as a sum of the metric scores corresponding to each of the web server metrics (e.g., CPU usage, requests per second, etc.), and the application server component score 530 can be calculated as a sum of the metric scores corresponding to each of the application server metrics (e.g., CPU usage, number of busy threads, in use connection count, virtual machine garbage collection interval, virtual machine garbage collection overhead, etc.).

In certain examples, performance metrics related to databases of the target system (also referred to as "database metrics") can be collected through the databases' own trace mechanisms (e.g., the HANA performance trace tables). After running the software application on the target system for a certain period of time (e.g., a few hours, etc.), a plurality of database metrics can be collected and saved in one or more data logs (e.g., 250). Example database metrics include average CPU usage, average memory usage, statements per second, cache hit ratio, number of blocked transactions, etc. Other performance metrics of interests pertaining to the databases may also be included. In these examples, the number of blocked transactions, average CPU usage, and average memory usage have negative variations, whereas all other database metrics have positive variations.

Similarly, for each database metric, a corresponding baseline value can be obtained based on measurement of that metric obtained in past performance tests which is deemed to be acceptable. Different database metrics can be assigned to respective weights. For example, the average CPU usage, average memory usage, statements per second, cache hit ratio, and number of blocked transactions can be assigned to respective weights of 40%, 20%, 20%, 10%, and 10% (with a total of 100%). Using the same formulas described above, the metric score for each of the database metrics can be calculated. According to a representative example, the database component score 540 can be calculated as a sum of the metric scores corresponding to each of the database metrics described above.

As described above, the target system can include multiple middleware servers, such as cache servers, message queue servers, and/or search engine servers. Such middleware servers are typically used by large scale cloud-based software applications. As described herein, a plurality of performance metrics related to middleware servers of the target system can be collected and saved in one or more data logs (e.g., 250).

Example performance metrics related to the middleware servers (also referred to as "middleware metrics") include (a) memory usage, throughput, and cache hit ratio measured from the cache servers, (b) CPU usage, memory usage, and requests per second measured from the message queue servers, and (c) CPU usage, memory usage, average request time, and cache hit ratio measured from the search engine servers. Other performance metrics of interests pertaining to the middleware servers may also be included. In these examples, metrics about CPU usage, memory usage, and average request time have negative variations, whereas all other middleware metrics have positive variations.

Similarly, for each middleware metric, a corresponding baseline value can be obtained based on measurement of that metric obtained in past performance tests which is deemed to be acceptable. Likewise, different baseline metrics can be assigned to respective weights. Using the same formulas described above, the metric score for each of the middleware metrics can be calculated. According to a representative example, the middleware component score 550 can be calculated as a sum of the metric scores corresponding to each of the middle metrics described above.

Example 8

Example Performance Metrics of Feature Tests

As described above, the feature test component score 560 can measure performance of specific features or functional areas of the software application. As described herein, performance of a feature test can be indicated by measured response times, which generally have negative variations (i.e., the shorter the response time, the better the performance).

The total points assigned to the feature tests can be divided among different feature tests (e.g., feature tests A, B, C, D, E, etc.), each of which has a corresponding weight. The weights assigned to different feature tests can be the same (e.g., 20% each for feature tests A-E) or different, depending on relevant importance of the tested features. For example, if the total points assigned to five feature tests (e.g., A-E) is 40 and each feature test is assigned a 20% weight, then each feature test is assigned a total of 8 points (also referred to as "total points assigned to the feature test").

In certain examples, each feature test can include multiple test cases, e.g., test case 1, test case 2, . . . , test case K (where K>1). Each test case can be run repetitively (e.g., N repetitions, where N=10, 20, 50, 100, etc.) on the CI/CD pipeline, and a statistical response time corresponding to the test case can be obtained from these repetitive runs. One example statistical response time is 90 percentile response time (PRT), which means that in 90% of test case runs, the measured response time is less than PRT. Although 90 percentile is described herein as an example, other percentiles (e.g., 85%, 95%, etc.) can be used to define the statistical response time as well.

Similar to other performance metrics, for each test case, a corresponding baseline value for the statistical response time (e.g., PRT), also referred to as the baseline response time (BRT) can be obtained based on measurement of statistical response time obtained in the past which is deemed to be acceptable. In addition, for each test case, a standard response time (SRT) can be predefined based on a product standard (e.g., specified in a software specification or requirement document). Typically, the SRT can be set proportional to the complexity of the test cases. For example, the SRT can be set to 1 second, 3 seconds, and 5 seconds for simple, medium, and complex test cases, respectively.

Thus, after running all test cases included in a feature test (e.g., K test cases) and each test case is repeated a number of times (e.g., N repetitions), the statistic response time (e.g., PRT) for each test case can be obtained and compared to the BRT and SRT, as illustrated in the following table, where the values are for shown as examples.

| Test Cases | PRT (sec) | BRT (sec) | SRT (sec) |
|---|---|---|---|
| Test case 1 | 3.5 | 3.1 | 1 |
| Test case 2 | 2.8 | 2.2 | 5 |
| . . . | . . . | . . . | . . . |
| Test case K | 1.8 | 1.2 | 3 |

In certain examples, for each test case (e.g., test case m) in a feature test, a corresponding test case score (e.g., TCS(m)) can be calculated based on the following formula:

$$TCS(m) = \frac{e^{a_m}}{\sum_{i=1}^{K} e^{a_i}} \left[ \beta \left( \frac{1 - e^{-\Delta 1_m}}{1 + e^{-\Delta 1_m}} \right) + (1 - \beta) \left( \frac{1 - e^{-\Delta 2_m}}{1 + e^{-\Delta 2_m}} \right) \right]$$

Here, $\dfrac{e^{a_m}}{\sum_{i=1}^{K} e^{a_i}}$ is a softmax function, and $a_m$ represents the SRT of the test case m. By applying the standard exponential function to each element $a_m$ and normalizing these values by dividing the sum of all these exponentials, such softmax functions can ensure that the sum of the components of the output is 1. Thus, using the softmax function, different weights can be produced for each different test cases according to respective SRT value while ensuring the sum of the weights is 1.

In the above equation, coefficient $\beta$ can be a predefined parameter (and can be customized in a configuration file, e.g., 270) that is between 0 and 1. The first fraction in the square bracket $$\left( i.e., \frac{1 - e^{-\Delta 1_m}}{1 + e^{-\Delta 1_m}} \right)$$

represents a score component based on a comparison of PRT with BRT, where the exponent $\Delta 1_m$ represents a difference between BRT and PRT, i.e., $\Delta 1_m$=BRT−PRT. In other words, $\Delta 1_m$ represents the deviation of the measured PRT for one specific test case (i.e., test case m) from its corresponding baseline value. The second fraction in the square bracket $$\left( i.e., \frac{1 - e^{-\Delta 2_m}}{1 + e^{-\Delta 2_m}} \right)$$

represents a score component based on a comparison of PRT with SRT, where the exponent $\Delta 2_m$ represents a difference between SRT and PRT, i.e., $\Delta 2_m$=SRT−PRT. In other words, $\Delta 2_m$ represents the deviation of the measured PRT for one specific test case (i.e., test case m) from its corresponding standard value.

The first fraction in the square bracket of the above equation generates an output ranging from −1 to 1. Specifically, the output is zero when $\Delta 1_m$ is zero (i.e., the measured PRT is equal to the corresponding BRT), increases (with an upper limit of 1) when the measured PRT gets smaller (i.e., improved performance), and decreases (with a lower limit of −1) when the measured PRT gets larger (i.e., degraded performance). Similarly, the second fraction in the square bracket of the above equation also generates an output ranging from −1 to 1. Specifically, the output is zero when $\Delta 2_m$ is zero (i.e., the measured PRT is equal to the corresponding SRT), increases (with an upper limit of 1) when the measured PRT gets smaller (i.e., improved performance), and decreases (with a lower limit of −1) when the measured PRT gets larger (i.e., degraded performance).

Because the coefficient β is between 0 and 1, each calculated test case score (e.g., TCS(m)) also ranges from −1 to 1. In certain examples, the feature score of a feature test can be calculated as $P \Sigma_{m=1}^{K} TCS(m)$, where P represents the total points assigned to the feature test. The feature score of a feature test thus adds all test case scores (within the feature test) together since the sum of the softmax function is 1. The calculated feature score can range from −P to P. For example, a negative feature score can indicate a poor performance of the feature test.

In certain examples, the feature test component score 560 can be calculated as a sum of feature scores that respectively correspond to different feature tests.

Example 9

Example Configuration of Weights for Performance Metrics

As described above, various weights and/or other parameters used in the calculation of performance score can be defined in a configuration file (e.g., 270). During different development phases of the software application, there may be different criteria and/or needs to put more focus or weight on certain components of the target system or certain features (functional areas) of the software application. For example, in the development phase for a new feature A, it may be desirable to give a higher weight to feature test of feature A while lowering the weights for the feature tests of other previously developed (and tested) features. As another example, when there is a Java virtual machine upgrade, it may be desirable to increase the relative weight for the Java virtual machine. In yet another example, when there is a database upgrade, it may be desirable to increase the weight corresponding to the database while decreasing the weight for the web server.

In certain examples, an administrator can adjust such weights and/or other parameters to customize performance evaluation as needed. For example, the configuration file can be a json format file which stores all weights that are used to calculate the performance score. The administrator can interact with the configuration file and update the weights via a web user interface. Any update made to the json format configuration file can affect subsequent performance evaluations. As one example, FIG. 6 shows a portion of a json format configuration file defining weights for calculating a performance score. As shown, the weights can be organized in a hierarchical structure. At the top level, weights for various component score are assigned (e.g., 20% for load test results, 10% for web server component, 10% for application server components, 10% for middleware components, and 40% for feature tests). The weights for individual performance metrics (e.g., throughput, etc.), individual servers (e.g., Redis, etc.), and individual feature tests (e.g., feature A, etc.) can be further specified at one or more lower levels. An automatic check function can be implemented to ensure that the sum of the weights at each level is 100%.

Example 10

Example Advantages

A number of advantages can be achieved via the technologies described herein. For example, the automatic performance evaluation technologies described herein can comprehensively evaluate many different aspects (e.g., response time, resource utilization, etc.) of a software application running on a target computer system, and generate a performance score that measures the overall performance of the software application. Based on such performance score, the automatic performance evaluation system can generate a pass or fail indicator. Such automatic performance evaluation system is particularly advantageous when integrated in a CI/CD pipeline where frequent software updates are expected. In the case of a performance test failure, the CI/CD pipeline can reject a software update and provide useful information (e.g., component scores) to guide the debugging process to fix the underlying problems. Conversely, passing of the performance test can enable and/or trigger release of the software update from the CI/CD pipeline. As a result, the automatic performance evaluation technologies described herein can safeguard the quality of software delivery and improve the overall efficiency of the CI/CD pipeline. Further, the automatic performance evaluation technologies described herein allows an administrator to dynamically adjust the weights and/or other parameters used for automatic performance evaluation according to different needs, thus making it flexible to adapt to different phases of software development and/or changing nature of the target system.

Example 11

Example Computing Systems

Figure 7:
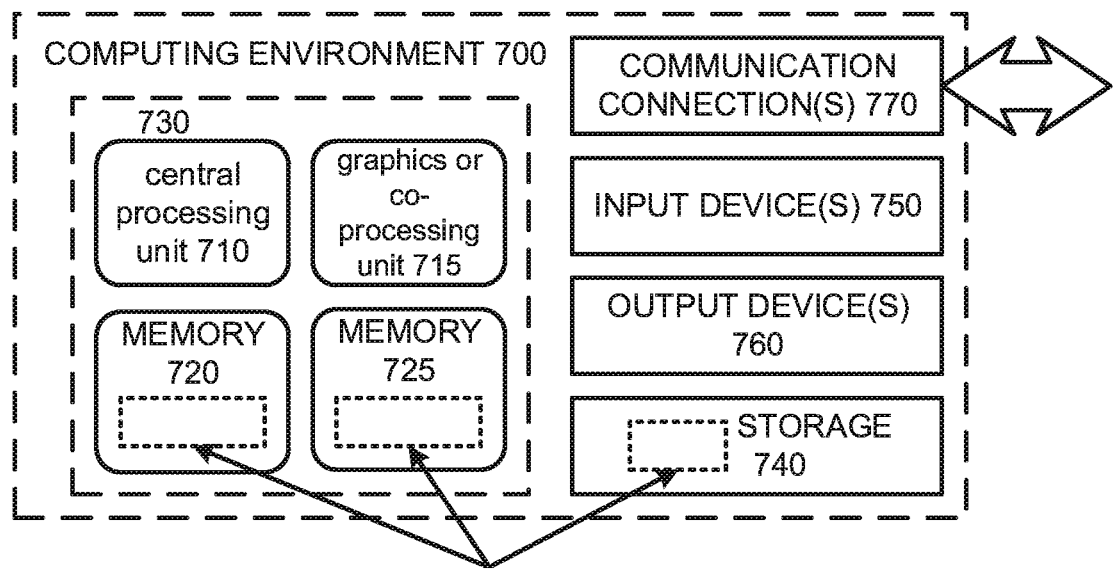
FIG. 7 is a block diagram of an example computing system in which described embodiments can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 can have additional features. For example, the computing system 700 includes storage 740, one or more input devices 750, one or more output devices 760, and one or more communication connections 770, including input devices, output devices, and communication connections for interacting with a user. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the method 400 implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 12

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 13

Example Cloud Computing Environment

Figure 8:
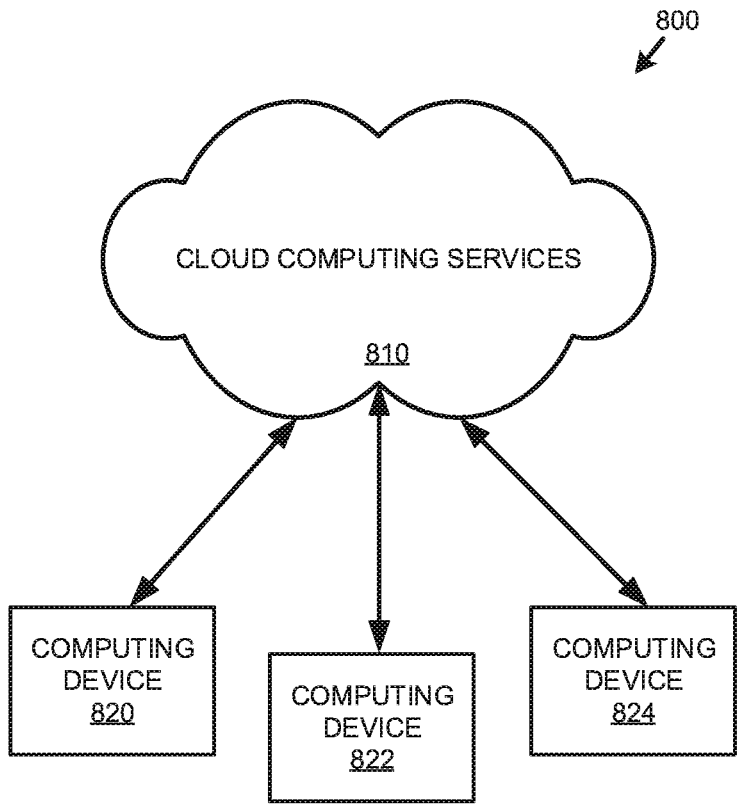
FIG. 8 is a block diagram of an example cloud computing environment that can be used in conjunction with the technologies described herein.

FIG. 8 depicts an example cloud computing environment 800 in which the described technologies can be implemented, including, e.g., the system disclosed above and other systems herein. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 823. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Example 14

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 15

Example Embodiments

Any of the following embodiments can be implemented.

Clause 1. A computer-implemented method comprising: receiving a software update for a software application deployable on a target system; performing an automatic performance test of the software application incorporating the software update on the target system, wherein the automatic performance test is integrated in a continuous integration and continuous delivery pipeline; collecting a plurality of performance metrics measured when performing the automatic performance test, wherein the plurality of performance metrics are stored in one or more data logs and indicate performance status of the software application running on the target system; determining a performance score based on the plurality of performance metrics; and responsive to detecting the performance score is below a predefined performance threshold, causing the continuous integration and continuous delivery pipeline to reject the software update to the software application.

Clause 2. The method of clause 1, wherein collecting the plurality of performance metrics comprises retrieving one or more load test metrics of the software application from the one or more data logs, wherein the load test metrics comprise throughput, hit per second, HTTP response per second, and error rate.

Clause 3. The method of any one of clauses 1-2, wherein collecting the plurality of performance metrics comprises retrieving one or more web server metrics from the one or more data logs, wherein the web server metrics comprise CPU usage and requests per second measured from one or more web servers included in the target system.

Clause 4. The method of any one of clauses 1-3, wherein collecting the plurality of performance metrics comprises retrieving one or more application server metrics from the one or more data logs, wherein the application server metrics comprise CPU usage, number of busy threads, in use connection count, virtual machine garbage collection interval, and virtual machine garbage collection overhead measured from one or more application servers included in the target system.

Clause 5. The method of any one of clauses 1-4, wherein collecting the plurality of performance metrics comprises retrieving one or more database metrics from the one or more data logs, wherein the database metrics comprise average CPU usage, average memory usage, statements per second, cache hit ratio, and number of blocked transactions measured from one or more databases included in the target system.

Clause 6. The method of any one of clauses 1-5, wherein the target system comprises one or more cache servers, one or more message queue servers, and one or more search engine servers.

Clause 7. The method of clause 6, wherein collecting the plurality of performance metrics comprises retrieving one or more middleware metrics from the one or more data logs, wherein the middleware metrics comprise (a) memory usage, throughput, and cache hit ratio measured from the one or more cache servers, (b) CPU usage, memory usage, and requests per second measured from the one or more message queue servers, and (c) CPU usage, memory usage, average request time, and cache hit ratio measured from the one or more search engine servers.

Clause 8. The method of any one of clauses 1-7, wherein collecting the plurality of performance metrics comprises retrieving one or more feature test metrics from the one or more data logs, wherein the feature test metrics comprise response times measured from one or more feature tests of the software application running on the target system.

Clause 9. The method of any one of clauses 1-8, wherein determining the performance score comprises determining a plurality of component scores based on the plurality of performance metrics, wherein the plurality of component scores respectively correspond to one or more feature tests of the software application running on the target system, and one or more components of the target system.

Clause 10. The method of clause 9, wherein determining the plurality of component scores comprises comparing the plurality of performance metrics with respective baseline values predetermined based on results of past automatic performance tests and applying respective weights to the plurality of performance metrics.

Clause 11. A computing system comprising: memory; one or more hardware processors coupled to the memory; and one or more computer readable storage media storing instructions that, when loaded into the memory, cause the one or more hardware processors to perform operations comprising: receiving a software update for a software application deployable on a target system; performing an automatic performance test of the software application incorporating the software update on the target system, wherein the automatic performance test is integrated in a continuous integration and continuous delivery pipeline; collecting a plurality of performance metrics measured when performing the automatic performance test, wherein the plurality of performance metrics are stored in one or more data logs and indicate performance status of the software application running on the target system; determining a performance score based on the plurality of performance metrics; and responsive to detecting whether the performance score meets a performance threshold, switching between: causing the continuous integration and continuous delivery pipeline to reject the software update to the software application if the performance score is below a predefined performance threshold; and releasing the software application incorporating the software update from the continuous integration and continuous delivery pipeline if the performance score is greater than or equal to the predefined performance threshold.

Clause 12. The system of clause 11, wherein the plurality of performance metrics comprise one or more load test metrics of the software application, wherein the load test metrics comprise throughput, hit per second, HTTP response per second, and error rate.

Clause 13. The system of any one of clauses 11-12, wherein the plurality of performance metrics comprise CPU usage and requests per second measured from one or more web servers included in the target system.

Clause 14. The system of any one of clauses 11-13, wherein the plurality of performance metrics comprise CPU usage, number of busy threads, in use connection count, virtual machine garbage collection interval, and virtual machine garbage collection overhead measured from one or more application servers included in the target system.

Clause 15. The system of any one of clauses 11-14, wherein the plurality of performance metrics comprise average CPU usage, average memory usage, statements per second, cache hit ratio, and number of blocked transactions measured from one or more databases included in the target system.

Clause 16. The system of any one of clauses 11-15, wherein the target system comprises one or more cache servers, one or more message queue servers, and one or more search engine servers, wherein the plurality of performance metrics comprise (a) memory usage, throughput, and cache hit ratio measured from the one or more cache servers, (b) CPU usage, memory usage, and requests per second measured from the one or more message queue servers, and (c) CPU usage, memory usage, average request time, and cache hit ratio measured from the one or more search engine servers.

Clause 17. The system of any one of clauses 11-16, wherein the plurality of performance metrics comprise response times measured from one or more feature tests of the software application running on the target system.

Clause 18. The system of any one of clauses 11-17, wherein the plurality of performance metrics comprise a plurality of component scores respectively corresponding to one or more feature tests of the software application running on the target system, and one or more components of the target system.

Clause 19. The system of clause 18, wherein the plurality of component scores are determined based on comparison of the plurality of performance metrics with respective baseline values predetermined based on results of past automatic performance tests, wherein respective weights are applied to the plurality of performance metrics.

Clause 20. One or more non-transitory computer-readable media having encoded thereon computer-executable instructions causing one or more processors to perform a method comprising: receiving a software update for a software application deployable on a target system; performing an automatic performance test of the software application incorporating the software update on the target system, wherein the automatic performance test is integrated in a continuous integration and continuous delivery pipeline; collecting a plurality of performance metrics measured when performing the automatic performance test, wherein the plurality of performance metrics are stored in one or more data logs and indicate performance status of the software application running on the target system; determining a performance score based on the plurality of performance metrics; and responsive to detecting whether the performance score meets a performance threshold, switching between: causing the continuous integration and continuous delivery pipeline to reject the software update to the software application if the performance score is below a predefined performance threshold; and releasing the software application incorporating the software update from the continuous integration and continuous delivery pipeline if the performance score is greater than or equal to the predefined performance threshold; wherein the plurality of performance metrics comprise a plurality of component scores respectively corresponding to one or more feature tests of the software application running on the target system, and one or more components of the target system; wherein the plurality of component scores are determined based on comparison of the plurality of performance metrics with respective baseline values predetermined based on results of past automatic performance tests, wherein respective weights are applied to the plurality of performance metrics.

Example 16

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
receiving a software update for a software application deployable on a target system;
performing an automatic performance test of the software application incorporating the software update on the target system, wherein the automatic performance test is integrated in a continuous integration and continuous delivery pipeline and performed prior to storing the software update in a code repository for other computing systems to download the software update;
collecting a plurality of performance metrics measured when performing the automatic performance test, wherein the plurality of performance metrics are stored in one or more data logs and indicate performance status of the software application running on the target system;
determining a performance score based on the plurality of performance metrics; and
responsive to detecting the performance score is below a predefined performance threshold, causing the continuous integration and continuous delivery pipeline to reject the software update to the software application and prevent the software update from being stored in the code repository.

2. The method of claim 1, wherein collecting the plurality of performance metrics comprises retrieving one or more load test metrics of the software application from the one or more data logs, wherein the load test metrics comprise throughput, hit per second, HTTP response per second, and error rate.

3. The method of claim 1, wherein collecting the plurality of performance metrics comprises retrieving one or more web server metrics from the one or more data logs, wherein the web server metrics comprise CPU usage and requests per second measured from one or more web servers included in the target system.

4. The method of claim 1, wherein collecting the plurality of performance metrics comprises retrieving one or more application server metrics from the one or more data logs, wherein the application server metrics comprise CPU usage, number of busy threads, in use connection count, virtual machine garbage collection interval, and virtual machine garbage collection overhead measured from one or more application servers included in the target system.

5. The method of claim 1, wherein collecting the plurality of performance metrics comprises retrieving one or more database metrics from the one or more data logs, wherein the database metrics comprise average CPU usage, average memory usage, statements per second, cache hit ratio, and number of blocked transactions measured from one or more databases included in the target system.

6. The method of claim 1, wherein the target system comprises one or more cache servers, one or more message queue servers, and one or more search engine servers.

7. The method of claim 6, wherein collecting the plurality of performance metrics comprises retrieving one or more middleware metrics from the one or more data logs, wherein the middleware metrics comprise (a) memory usage, throughput, and cache hit ratio measured from the one or more cache servers, (b) CPU usage, memory usage, and requests per second measured from the one or more message queue servers, and (c) CPU usage, memory usage, average request time, and cache hit ratio measured from the one or more search engine servers.

8. The method of claim 1, wherein collecting the plurality of performance metrics comprises retrieving one or more feature test metrics from the one or more data logs, wherein the feature test metrics comprise response times measured from one or more feature tests of the software application running on the target system.

9. The method of claim 1, wherein determining the performance score comprises determining a plurality of component scores based on the plurality of performance metrics, wherein the plurality of component scores respectively correspond to one or more feature tests of the software application running on the target system, and one or more components of the target system.

10. The method of claim 9, wherein determining the plurality of component scores comprises comparing the plurality of performance metrics with respective baseline values predetermined based on results of past automatic performance tests and applying respective weights to the plurality of performance metrics.

11. A computing system comprising:
memory;
one or more hardware processors coupled to the memory; and
one or more computer readable storage media storing instructions that, when loaded into the memory, cause the one or more hardware processors to perform operations comprising:
receiving a software update for a software application deployable on a target system;
performing an automatic performance test of the software application incorporating the software update on the target system, wherein the automatic performance test is integrated in a continuous integration and continuous delivery pipeline and performed prior to storing the software update in a code repository for other computing systems to download the software update;
collecting a plurality of performance metrics measured when performing the automatic performance test, wherein the plurality of performance metrics are stored in one or more data logs and indicate performance status of the software application running on the target system;
determining a performance score based on the plurality of performance metrics; and
responsive to detecting whether the performance score meets a performance threshold, switching between:
(a) causing the continuous integration and continuous delivery pipeline to reject the software update to the software application and prevent the software update from being stored in the code repository if the performance score is below a predefined performance threshold; and
(b) releasing the software application incorporating the software update from the continuous integration and continuous delivery pipeline and storing the software update in the code repository if the performance score is greater than or equal to the predefined performance threshold.

12. The system of claim 11, wherein the plurality of performance metrics comprise one or more load test metrics of the software application, wherein the load test metrics comprise throughput, hit per second, HTTP response per second, and error rate.

13. The system of claim 11, wherein the plurality of performance metrics comprise CPU usage and requests per second measured from one or more web servers included in the target system.

14. The system of claim 11, wherein the plurality of performance metrics comprise CPU usage, number of busy threads, in use connection count, virtual machine garbage collection interval, and virtual machine garbage collection overhead measured from one or more application servers included in the target system.

15. The system of claim 11, wherein the plurality of performance metrics comprise average CPU usage, average memory usage, statements per second, cache hit ratio, and number of blocked transactions measured from one or more databases included in the target system.

16. The system of claim 11, wherein the target system comprises one or more cache servers, one or more message queue servers, and one or more search engine servers, wherein the plurality of performance metrics comprise a. memory usage, throughput, and cache hit ratio measured from the one or more cache servers, b. CPU usage, memory usage, and requests per second measured from the one or more message queue servers, and c. CPU usage, memory usage, average request time, and cache hit ratio measured from the one or more search engine servers.

17. The system of claim 11, wherein the plurality of performance metrics comprise response times measured from one or more feature tests of the software application running on the target system.

18. The system of claim 11, wherein the plurality of performance metrics comprise a plurality of component scores respectively corresponding to one or more feature tests of the software application running on the target system, and one or more components of the target system.

19. The system of claim 18, wherein the plurality of component scores are determined based on comparison of the plurality of performance metrics with respective baseline values predetermined based on results of past automatic performance tests, wherein respective weights are applied to the plurality of performance metrics.

20. One or more non-transitory computer-readable media having encoded thereon computer-executable instructions causing one or more processors to perform a method comprising:
receiving a software update for a software application deployable on a target system;
performing an automatic performance test of the software application incorporating the software update on the target system, wherein the automatic performance test is integrated in a continuous integration and continuous delivery pipeline and performed prior to storing the software update in a code repository for other computing systems to download the software update;
collecting a plurality of performance metrics measured when performing the automatic performance test, wherein the plurality of performance metrics are stored in one or more data logs and indicate performance status of the software application running on the target system;
determining a performance score based on the plurality of performance metrics; and
responsive to detecting whether the performance score meets a performance threshold, switching between:

(a) causing the continuous integration and continuous delivery pipeline to reject the software update to the software application and prevent the software update from being stored in the code repository if the performance score is below a predefined performance threshold; and (b) releasing the software application incorporating the software update from the continuous integration and continuous delivery pipeline and storing the software update in the code repository if the performance score is greater than or equal to the predefined performance threshold;

wherein the plurality of performance metrics comprise a plurality of component scores respectively corresponding to one or more feature tests of the software application running on the target system, and one or more components of the target system;

wherein the plurality of component scores are determined based on comparison of the plurality of performance metrics with respective baseline values predetermined based on results of past automatic performance tests, wherein respective weights are applied to the plurality of performance metrics.

* * * * *